US011309933B2

(12) United States Patent
Upadhyay et al.

(10) Patent No.: US 11,309,933 B2
(45) Date of Patent: Apr. 19, 2022

(54) AUTO-BALANCING TRANSFORMERS

(71) Applicant: Hitachi Energy Switzerland AG, Baden (CH)

(72) Inventors: Parag Upadhyay, Morrisville, NC (US); Mirrasoul Mousavi, Cary, NC (US)

(73) Assignee: Hitachi Energy Switzerland AG, Baden (CH)

( * ) Notice: Subject to any disclaimer, the term of this patent is extended or adjusted under 35 U.S.C. 154(b) by 1220 days.

(21) Appl. No.: 15/684,372

(22) Filed: Aug. 23, 2017

(65) Prior Publication Data

US 2018/0006679 A1 Jan. 4, 2018

Related U.S. Application Data

(63) Continuation of application No. PCT/US2016/019096, filed on Feb. 23, 2016.

(60) Provisional application No. 62/119,797, filed on Feb. 23, 2015.

(51) Int. Cl.
| | |
|---|---|
| *H01F 30/14* | (2006.01) |
| *H04B 1/58* | (2006.01) |
| *H01F 29/10* | (2006.01) |
| *H01F 17/00* | (2006.01) |
| *H01F 30/12* | (2006.01) |

(52) U.S. Cl.
CPC ......... *H04B 1/582* (2013.01); *H01F 17/0013* (2013.01); *H01F 29/10* (2013.01); *H01F 30/12* (2013.01); *H01F 30/14* (2013.01)

(58) Field of Classification Search
CPC .......... H01F 30/12; H01F 30/14; H01F 29/10; H01F 29/08; H01F 17/0013; H01F 21/02; H01F 21/04; H01F 21/06
USPC ... 336/5, 10, 40, 70, 79, 115–122, 130–133, 336/135
See application file for complete search history.

(56) References Cited

U.S. PATENT DOCUMENTS

| | | | |
|---|---|---|---|
| 6,166,531 A | 12/2000 | Hogan | |
| 8,536,971 B1 * | 9/2013 | Waseem | H01F 38/42 336/212 |
| 2012/0126923 A1 * | 5/2012 | Navarro | H01F 27/324 336/5 |

FOREIGN PATENT DOCUMENTS

| | | | | |
|---|---|---|---|---|
| FR | 1203175 A | * | 1/1960 | ............. H01F 29/10 |
| FR | 2501900 A1 | * | 9/1982 | ............. H01F 38/04 |
| GB | 191302471 A | * | 4/1913 | ............. H01F 38/02 |
| GB | 640100 | | 7/1950 | |
| GB | 711398 | | 6/1954 | |
| GB | 1433402 | | 4/1976 | |

OTHER PUBLICATIONS

Search Report and Written Opinion, PCT Appln. No. PCT/US16/019096, dated Apr. 29, 2016, 11 pgs.

(Continued)

*Primary Examiner* — Tszfung J Chan
(74) *Attorney, Agent, or Firm* — Sage Patent Group

(57) ABSTRACT

Auto-balancing transformers are disclosed for balancing a multi-phase electrical system by varying the degree of electromagnetic coupling between primary and secondary windings. The auto-balancing transformer includes a movable armature to selectively couple primary phases with two or fewer phases of the secondary system.

16 Claims, 12 Drawing Sheets

(56) References Cited

OTHER PUBLICATIONS

Pazouki, D., "A novel Brushless Synchro: Operation Principle and Experimental Results", 21st Iranian Conference on Electrical Engineering (ICEE), as early of Jan. 2013, pp. 1-6.

Heartz, R.A., "Design of Nigh-Precision Synchros and Resolvers", Transactions of the American Institute of Electrical Engineers, Part II: Applications and Industry, vol. 74, Issue: 6, Jan. 1, 1956, pp. 421-426.

* cited by examiner

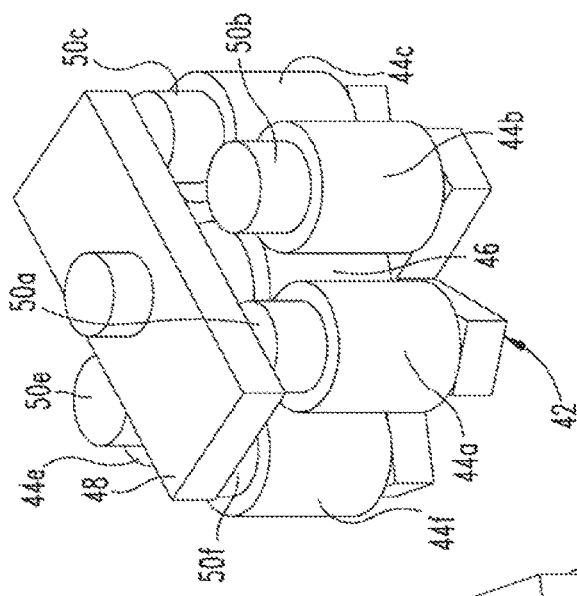
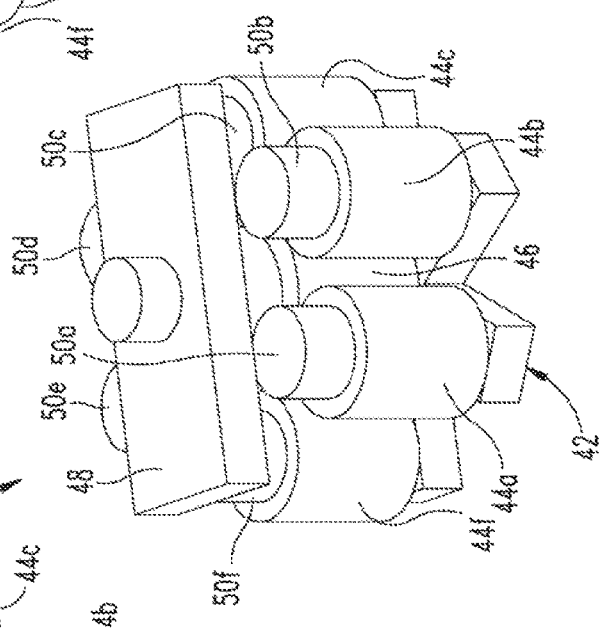
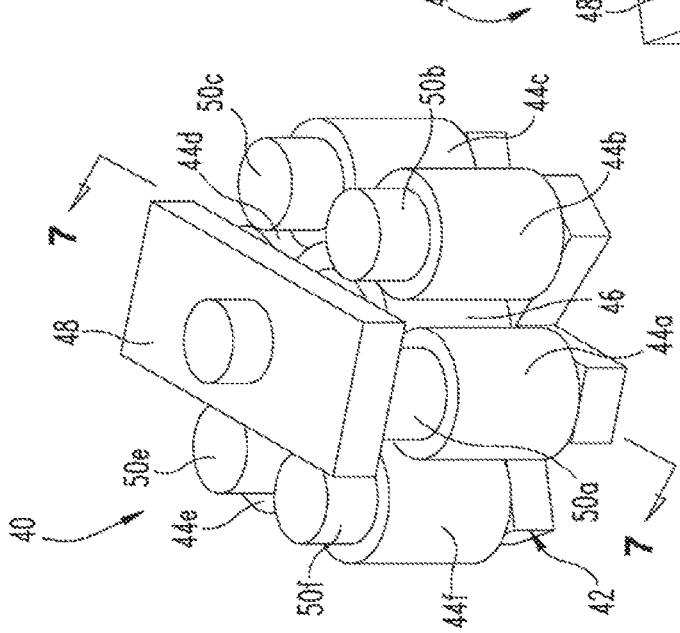

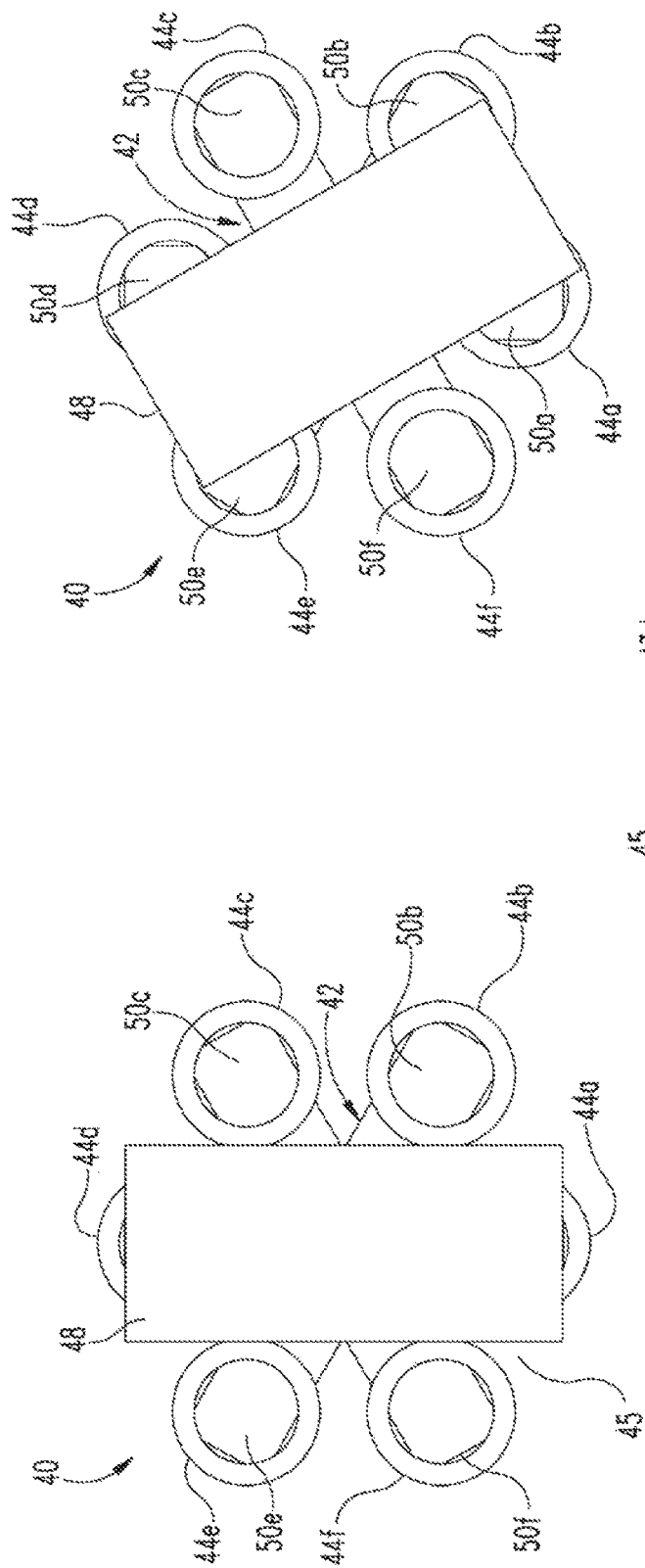
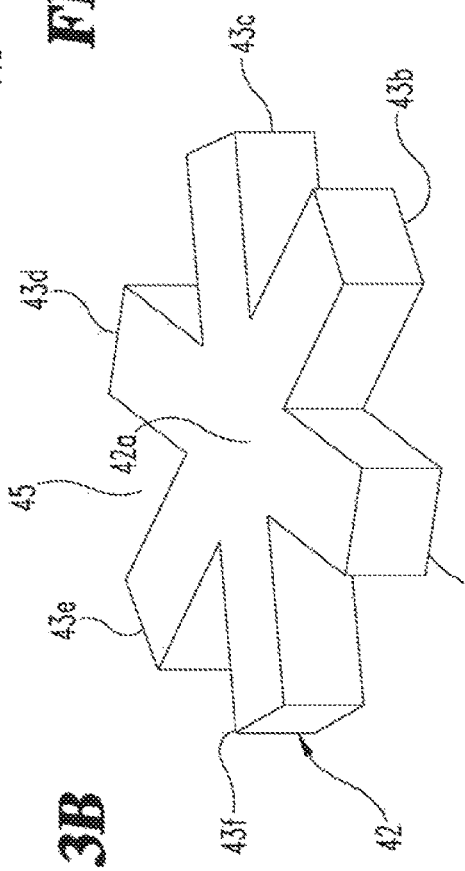

AUTO-BALANCING TRANSFORMERS

CROSS-REFERENCE TO RELATED APPLICATION

The present application claims the benefit of the filing date of U.S. Provisional Application Ser. No. 62/119,797 filed on Feb. 23, 2015, which is incorporated herein by reference.

FIELD OF THE DISCLOSURE

The present disclosure relates to electrical transformers, and more particularly to transformers that automatically mitigate current and voltage imbalances in response to load variation in at least one of the phases.

BACKGROUND

Electrical power distribution and transmission systems employing three phase power can develop current imbalances where many loads applied to the distribution grid are single phase and dual phase loads. It is desirable to distribute the load equally amongst the three phases so that the adverse effects of unbalanced distortion are mitigated.

The Scott-type transformer connection illustrated in FIGS. 16 and 17 may be used to transform three phase power into two phase power. The balanced primary currents induce the two phase secondary current. Two transformers are required and they are magnetically decoupled. The secondary winding has a fixed mutual coupling with the primary phases as shown in the vector diagram of FIG. 17. However, the Scott-type transformer is not able to mitigate imbalance conditions of a multi-phase system.

Thus, efforts to date to provide load balancing in three phase and other multi-phase distribution systems have been limited to manual changeovers by the line crew on a yearly or interval basis. With increased penetration of distributed energy resources and circuit dynamics, there remains a need for improvement in this area.

BRIEF DESCRIPTION OF DRAWINGS

FIG. 3A is a perspective view of another nonexclusive illustrative example of an auto-balancing transformer, shown with the armature positioned to couple a first phase.

FIG. 3B is a top view of the auto-balancing transformer of FIG. 3A, shown with the armature coupling the first phase.

FIG. 3C is a perspective view of the yoke of the auto-balancing transformer of FIG. 3A.

FIG. 4 is a perspective view of the auto-balancing transformer of FIG. 3A, shown with the armature coupling a second phase.

FIG. 5A is a perspective view of the auto-balancing transformer of FIG. 3A, shown with the armature coupling both the first and second phases.

FIG. 5B is a top view of the auto-balancing transformer of FIG. 5A, shown with the armature coupling both the first and second phases.

DETAILED DESCRIPTION

Figure 1:
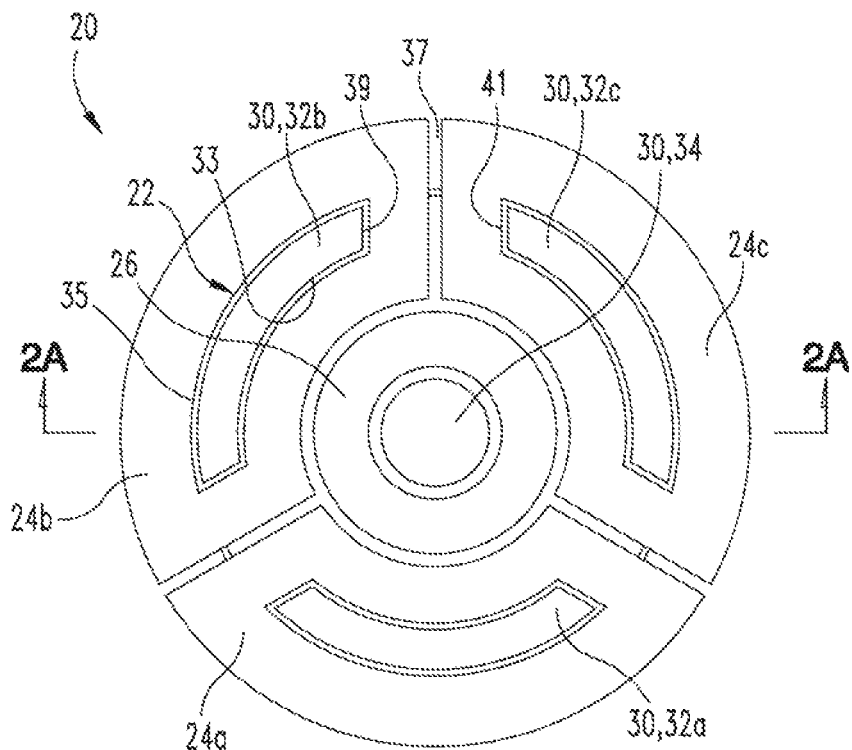
FIG. 1 is a top view of a nonexclusive illustrative example of an auto-balancing transformer, with an armature for electromagnetically coupling primary and secondary windings omitted.
Figure 2A:
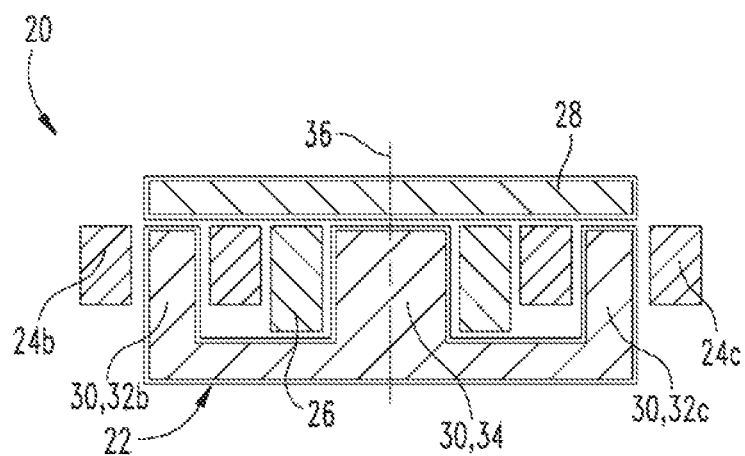
FIG. 2A is a longitudinal cross-section view of the auto-balancing transformer of FIG. 1, taken generally along line 2A-2A in FIG. 1, shown with the armature.
Figure 2B:
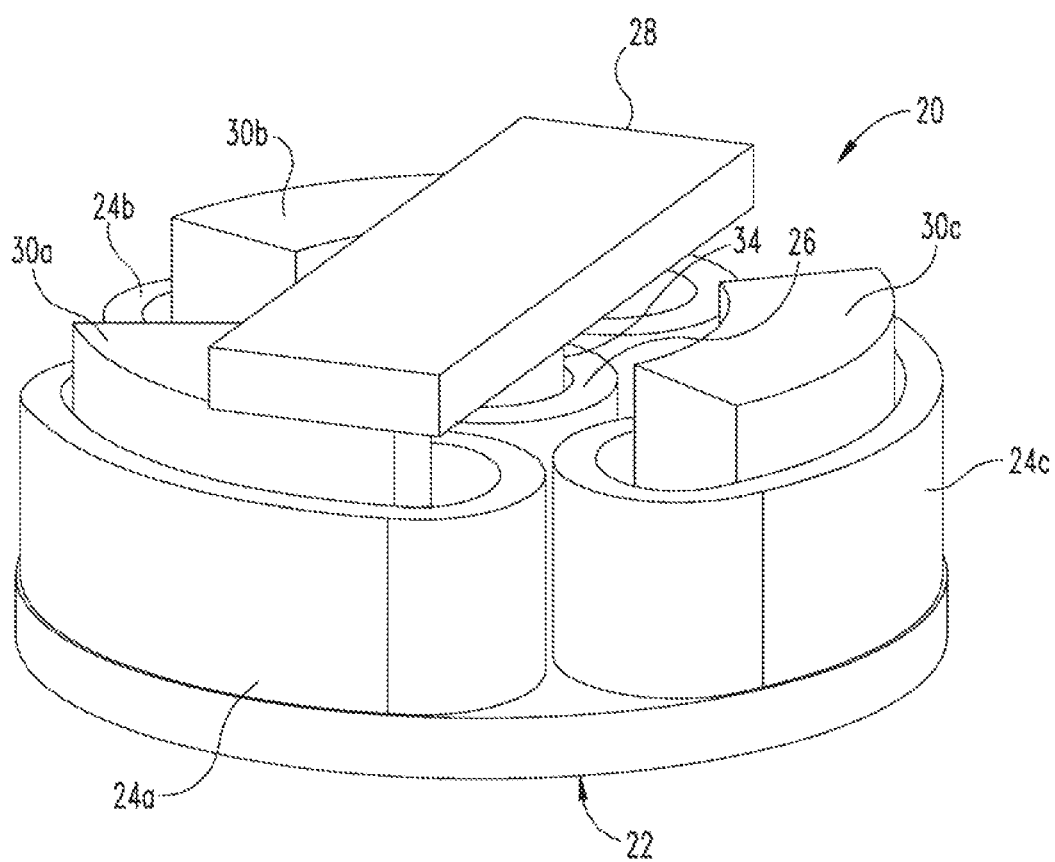
FIG. 2B is a perspective view of the auto-balancing transformer of FIG. 1.
Figure 6:
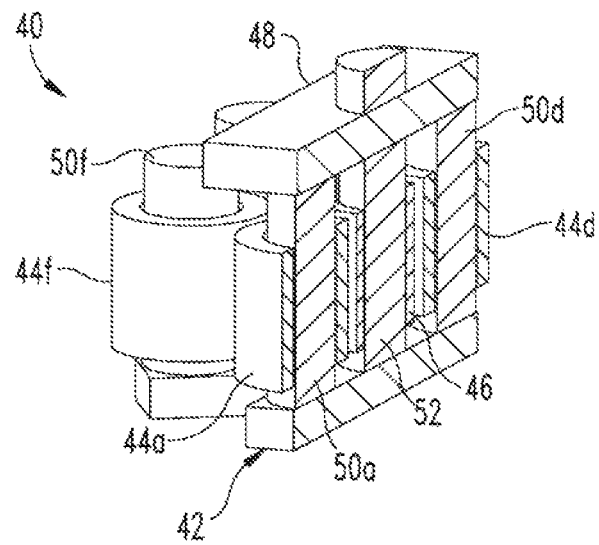
FIG. 6 is a perspective partial view of the auto-balancing transformer of FIG. 3A, shown with the armature coupling one phase.
Figure 7:
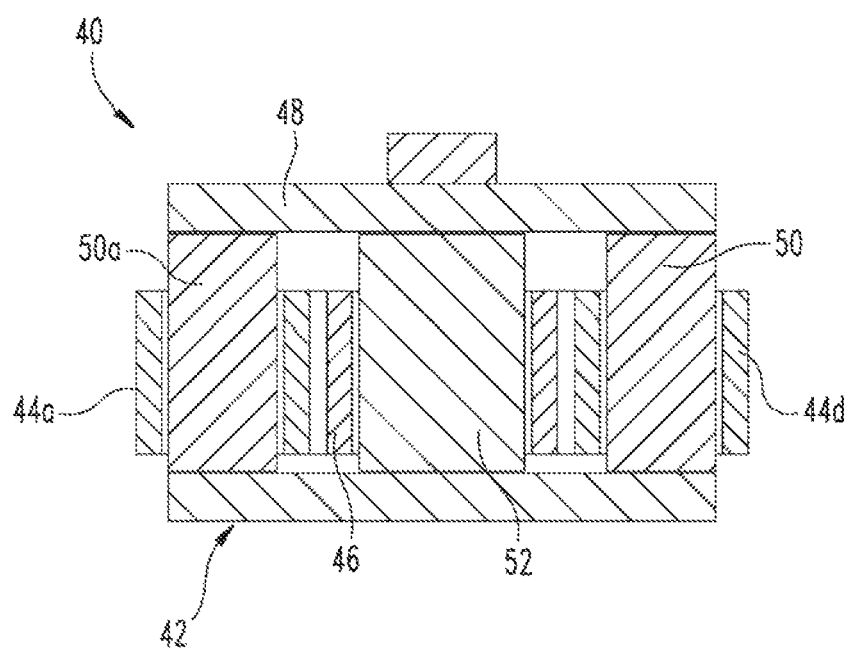
FIG. 7 is a cross section view of the auto-balancing transformer of FIG. 3A, taken generally along line 7-7 in FIG. 3A, shown with the armature coupling one phase.

A nonexclusive illustrative example of an auto-balance or auto-balancing transformer is shown generally at 20 in FIGS. 1 and 2A-2B. Unless otherwise specified, the auto-balancing transformer 20 may, but is not required to, contain at least one of the structures, components, functionalities, and/or variations described, illustrated, and/or incorporated herein. In the illustrated example, the auto-balancing transformer 20 includes a yoke 22, a plurality of primary windings 24, a secondary winding 26 and a movable armature 28. The auto-balancing transformer 20 is a three limbed, three-phase auto-balancing transformer. In other nonexclusive illustrative examples, the auto-balancing transformer 20 may be a two-phase auto-balancing transformer.

As shown in FIGS. 1 and 2A-2B, the yoke 22 may include a plurality of limbs 30 (e.g., limbs 30a-30c in FIG. 2B), about which the primary and/or secondary windings 24, 26 are wound or otherwise disposed, such that the limb and its associated winding coil form a pole. The limbs 30 may be fabricated from a suitable soft magnetic material, which may be laminated, and which may be a highly permeable soft magnetic material, which may be grain oriented or non-grain oriented transformer grade steel.

In the nonexclusive illustrative example of FIGS. 1 and 2, the auto-balancing transformer 20 has a three-phase primary and a single phase secondary. As may be seen in FIG. 2, the auto-balancing transformer 20 has an axial gap, with three peripherally located primary limbs 32a, 32b, 32c surrounded by respective ones of the three phase windings 24*a*, 24*b*, 24*c*, and a single phase secondary winding 26 located on the center or secondary limb 34. As shown in FIG. 2A, the primary-to-secondary coupling may be varied by physically changing the relative orientation of the movable armature 28, such as by rotating the armature 28 about the axis 36. For example, armature 28 can be rotated or otherwise moved to be positioned to vary the degree of electromagnetically coupling any one or two of the primary windings 24*a*, 24*b*, 24*c* to the secondary winding 26 by positioning armature 28 over the one or pair of primary limbs 32*a*, 32*b*, 32*c* to be coupled.

Primary limbs 32*a*, 32*b*, 32*c* are segmented circumferentially about yoke 22 so that a gap is provided between adjacent ones of the limbs 32*a*, 32*b*, 32*c* to receive primary windings 24*a*, 24*b*, 24*c* therebetween. Primary limbs 32*a*, 32*b*, 32*c* are spaced radially from and extend circumferentially about secondary limb 34. In the illustrated embodiment, each of the primary limbs 32*a*, 32*b*, 32*c* includes a concavely curved inner surface 33 facing secondary limb 34 and an opposite convexly curved outer sidewall 35 with end faces 39, 41 extending therebetween at opposite ends of the respective limb, as shown on primary limb 32*b*, it being understood that primary limbs 32*a* and 32*c* are similarly shaped. In addition, an axial gap 37 is fenced between each of the adjacent end faces 39, 41 of adjacent ones of the primary limbs 32*a*, 32*b*, 32*c*, thus providing three axial gaps.

Another nonexclusive illustrative example of an auto-balancing transformer is shown generally at 40 in FIGS. 3A through 7. Unless otherwise specified, the auto-balancing transformer 40 may, but is not required to, contain at least one of the structures, components, functionalities, and/or variations described, illustrated, and/or incorporated herein. The auto-balancing transformer 40 includes a yoke 42, a plurality of primary windings 44*a*, 44*b*, 44*c*, 44*d*, 44*e*, 44*f*, a secondary winding 46 and a movable armature 48 opposite yoke 42. Primary windings 44*a*-44*f* may also be referred to herein collectively and individually as primary winding or windings 44. Primary windings 44 surround secondary winding 46, which is mounted around a central secondary limb 52.

The yoke 42 may include a plurality of peripherally locates primary limbs 50*a*, 50*b*, 50*c*, 50*d*, 50*e*, 50*f* extending from a respective one of the arms 43*a*, 43*b*, 43*c*, 43*d*, 43*e*, 43*f* of yoke 42. Primary limbs 50*a*-50*f* and arms 43*a*-43*f* may be referred to herein collectively and individually as limbs or limb 50 and arms or arm 43. As shown in FIG. 3B, yoke 42 includes a central portion 42*a* and arms 43 extend radially outwardly from central portion 42*a* to a respective terminal end so that the terminal ends are spaced from one another by a circumferential gap 45. Limbs 50 extend orthogonally from a respective one of the arms 43 at or near the terminal end of the respective arm 43. Secondary limb 52 extends orthogonally from central portion 42*a* in parallel relation with primary limbs 50.

Each of the limbs 50 may be laminated. To achieve the roughly circular cylindrical cross-section for each limb 50 shown in the Figures, the limbs 50 may comprise a laminated stepped core to make the cross section substantially cylindrical, which may reduce the necessary copper material. The core of the limbs 50 may be made up of highly permeable soft magnetic material, which is grain oriented or non-grain oriented transformer grade steel.

As may be seen in FIGS. 3A-7, the auto-balancing transformer 40 is a six limbed three-phase auto-balancing transformer, where each phase has a pair of opposed limbs 50*a*-50*d*, 50*b*-50*e*, and 50*c*-50*f*, respectively, with primary windings 44*a*-44*f* mounted on a respective one of the primary limbs 50. It is within the scope of this disclosure for a three-phase auto-balancing transformer to have any suitable number of limbs, such as 3X limbs, where X is a positive integer.

With regard to function of the auto-balancing transformer 40, rotation or movement of the armature 48 permits coupling of one or more phases. In FIG. 3A, a first phase with primary windings 44*a*, 44*d* on limbs 50*a*, 50*d* is coupled by armature 48. In FIG. 4, a second phase is coupled by armature 48 with primary winding 44*c*, 44*f* on limbs 50*c*, 50*f*. However, in FIGS. 5A-5B, both the first and second phases including primary windings 50*a*, 50*d* and primary windings 50*c*, 50*f* are coupled by armature 48, which may permit balancing between the phases. Armature 48 can be connected to a motor or other suitable actuator (not shown) to provide the desired positioning for balancing of loads on the phases.

Figure 8:
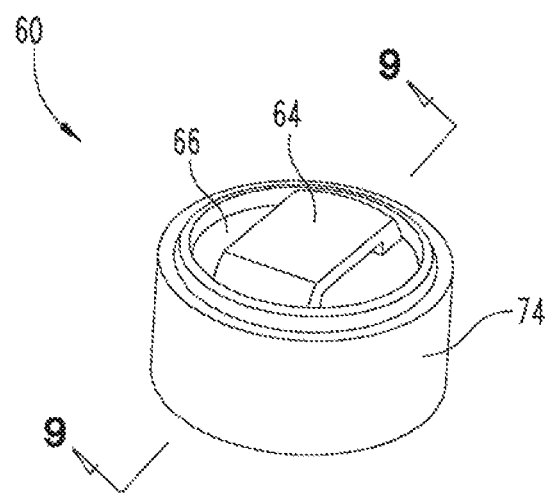
FIG. 8 is a perspective view of another nonexclusive illustrative example of an auto-balancing transformer.
Figure 9:
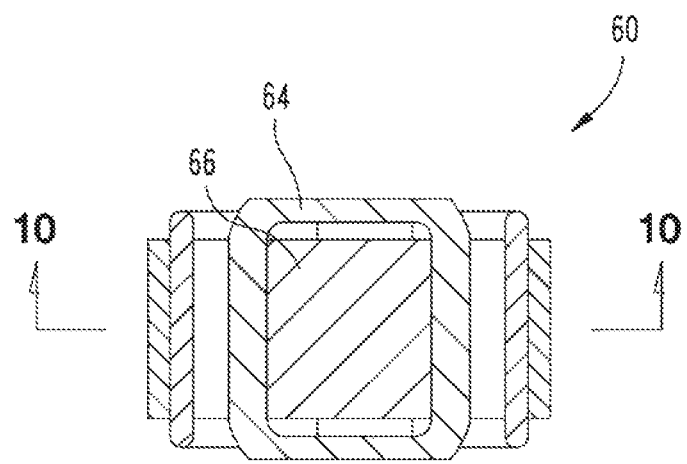
FIG. 9 is a longitudinal axial cross-section view of the auto-balancing transformer of FIG. 8, taken generally along line 9-9 in FIG. 8.
Figure 10:
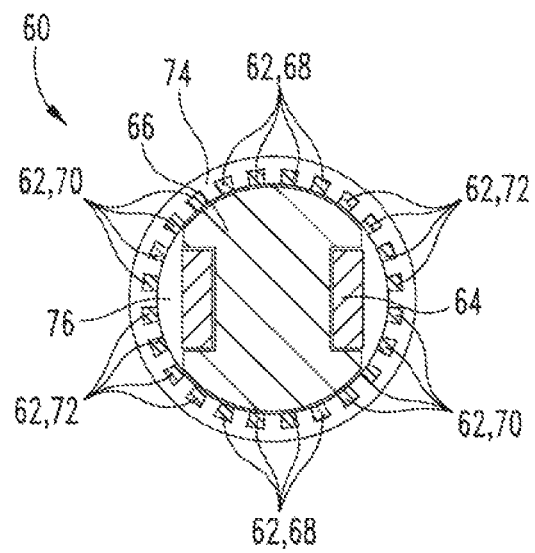
FIG. 10 is a cross-section view of the auto-balancing transformer of FIG. 8, taken generally along line 10-10 in FIG. 9.

Another nonexclusive illustrative example of an auto-balancing transformer is shown generally at 60 in FIGS. 8 through 10. Unless otherwise specified, the auto-balancing transformer 60 may, but is not required to, contain at least one of the structures, components, functionalities, and/or variations described, illustrated, and/or incorporated herein. The auto-balancing transformer 60 includes a stator 74 with a plurality of primary windings 62, a secondary windings 64 within stator 74, and a rotor or movable armature 66. As may be seen from FIG. 10, the auto-balancing transformer 60 has a radial gap 76 between secondary winding 64 and the non-coupled primary windings 62. In the illustrated example, three opposing pairs of windings on stator 74 form three primary windings 68, 70, 72 to provide three phases.

The rotor position changes the mutual coupling between armature 66 and stator 74. The resulting magnetic circuit alleviates stator current unbalance due to the variation of magnetic coupling and rotor magnetomotive force (MMF). A separate magnetic path for the primary windings can be provided to maintain the magnetizing inductance of the primary windings 68, 70, 72 when not coupled to the secondary winding 64. The magnetic circuit created in the disclosed auto-balancing transformer 60 may make the stator current unbalanced due to the variation of magnetic coupling and rotor MMF created due to the load on secondary winding 64. Therefore, the armature 66 and secondary winding 64 are configured to create a desired magnetic coupling between the three phase primary windings 68, 70, 72 and the single phase secondary winding 64 for load balancing, In some examples, the stator 74 of the auto-balancing transformer 60 may be laminated from motor grade steel and include three-phase concentrated tooth wound and distributed lap wound type primary windings. In some examples, concentrated or distributed secondary winding shown may be provided on the rotating/movable armature 66.

The windings of primary windings 62 of the auto-balancing transformer 60 may be fixed to the stator 74 and comprise distributed lap wound or a concentric tooth windings spaced along 60 degree intervals of stator 74 so that each of primary windings 68, 70, 72 occupies a third of the circumference of stator 74. The stator 74 may be excited by an alternating current, which by electromagnetic induction, causes electromotive force (EMF) in the windings of secondary winding 64 located over the armature 66. The magnetic coupling between the windings of primary windings 62 (as an individual phase) and the windings of secondary winding 64 varies with the rotor position. An unequal magnetic coupling may cause unbalanced primary currents based on the load on the windings of secondary winding 64.

The armature 66 may be rotated or moved in angular position relative to stator 74 using an external servo-mechanism or a self-actuating system, which may be guided by the degree of unbalance loading in the feeder, to couple one or two phases of auto-balancing transformer 60 to distribute the feeder load to more lightly loaded phase(s) associated with one or two of primary windings 68, 70, 72.

Figure 11:
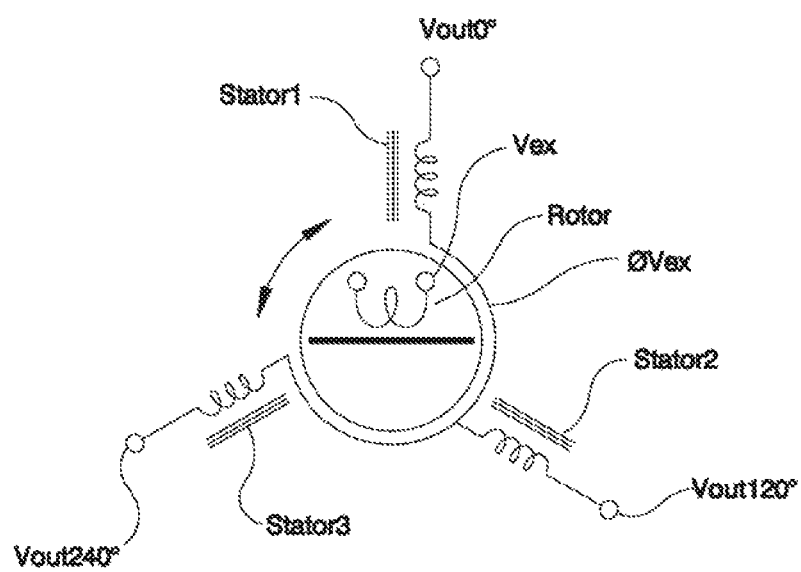
FIG. 11 illustrates the Synchro principle, which may be used for position sensing and amplification.

For example, as may be understood to those of ordinary skill in the art, the synchro principle, as illustrated in FIG. 11, may be used for servo amplifier control and position control. The synchro principle can be used as a position sensor to determine the position of armature 66 and for positioning servo amplifiers. The armature 66 is excited by an AC source, and then the rotor/armature to stator coupling is varied by physically changing the relative orientation of the two windings as suggested in FIG. 11. The mutual inductance is changed between the stator and armature. As may be understood, the armature position creates phase displacements in the stator induced three phase EMF.

Figure 12:
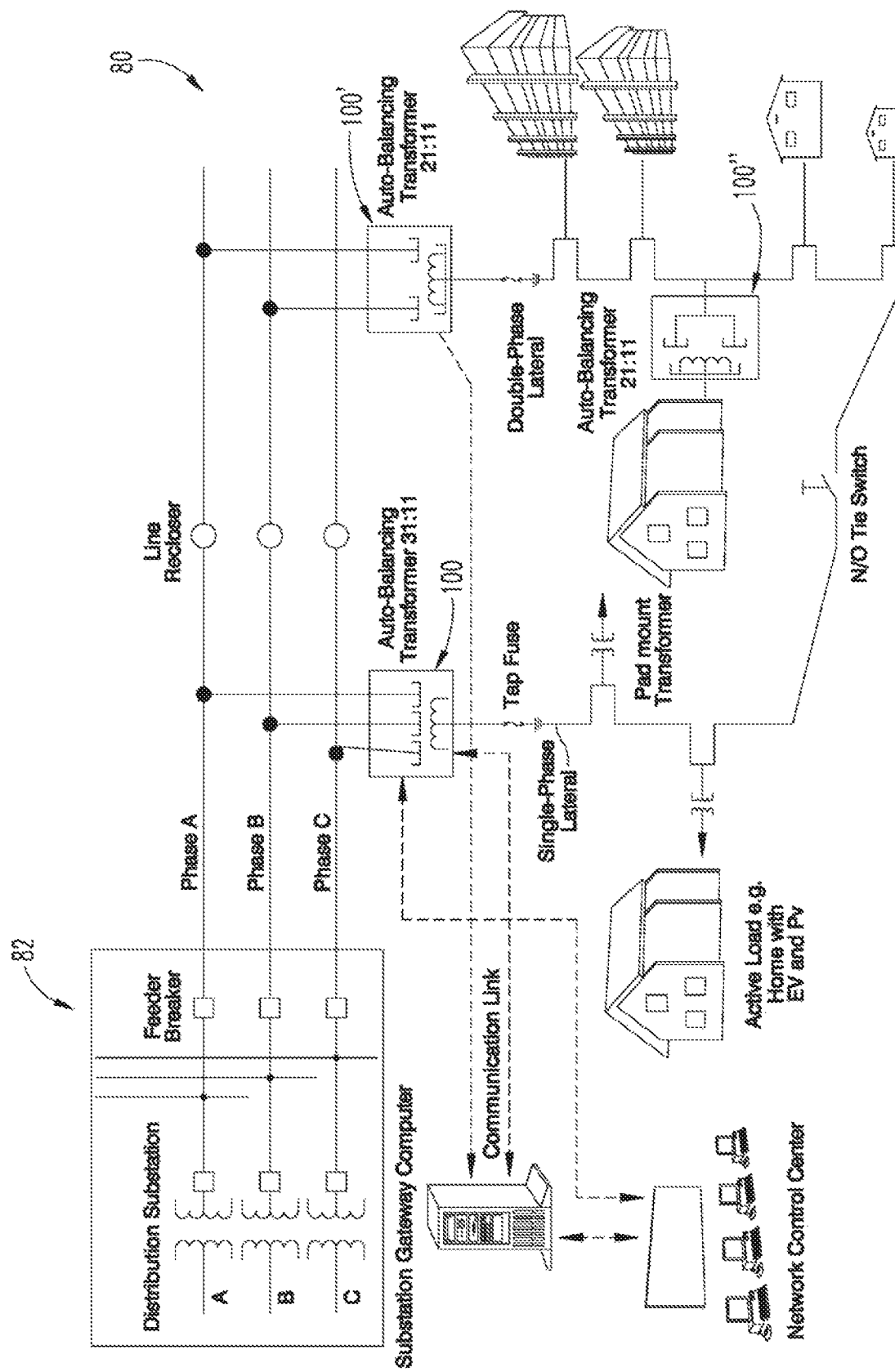
FIG. 12 illustrates auto-balancing transformer applications in a distribution grid.

As may be understood, auto-balancing transformers as disclosed herein, generally or collectively referred to as auto-balancing transformers 100 in FIG. 12, may be used in a distribution grid or network, such as the nonexclusive illustrative example distribution grid 80 shown in FIG. 12. In some examples, distribution grids may include highly unbalanced loads coupled to the secondary windings of conventional service transformers. Replacement of one or a few of such service transformers, such as pole-mounted transformers on short laterals, with an auto-balancing transformer 100 as disclosed herein may be used to create an unbalanced current to counter balance or counteract the unbalance that pre-exists on the grid 80. The auto-balancing transformer 100 may also be used to balance the feeder currents supplied through the sub-station transformer 82, and may reduce distribution losses.

As shown in FIG. 12, the auto-balancing transformers 100 discussed herein may be installed at one voltage level and connected to each of the three phases A, B, C of distribution grid 80. In other embodiments, a modified auto-balancing transformer 100' may be connected to just two phases A and B of the distribution grid 80. In still other embodiments, an auto-balancing transformer 100" may be connected at a different voltage level. The turns ratio may therefore be one or N, where N is the ratio of turns between the primary coil winding and secondary coil winding of each phase. In some examples, different phases may be wound with different turn ratios to achieve a desired coupling coefficient.

Figure 13:
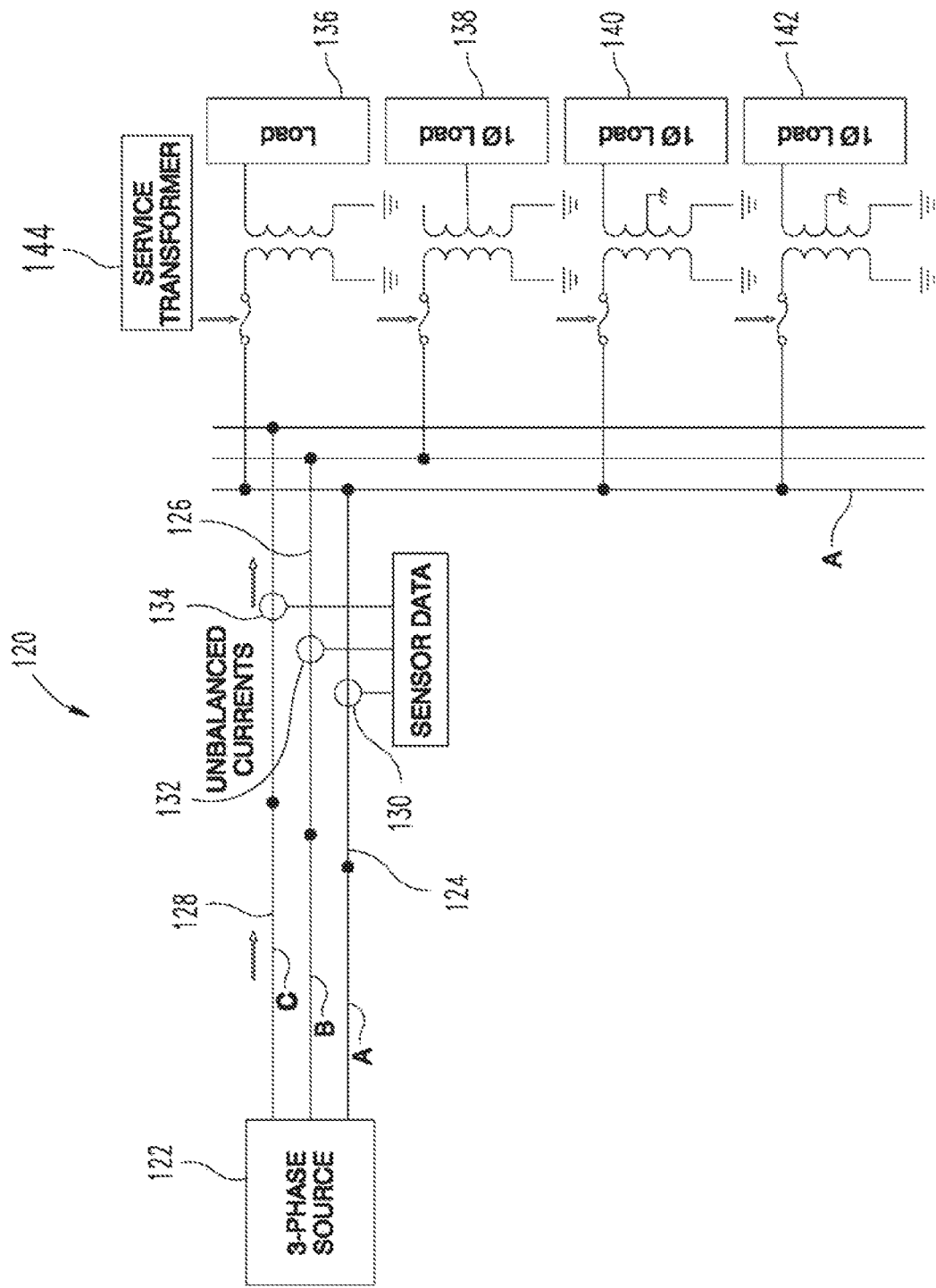
FIG. 13 is a schematic diagram of a nonexclusive illustrative example of a distribution grid, shown without an auto-balancing transformer.

Referring to FIG. 13, there is shown an example distribution circuit 120 that includes three phases A, B, C fed by three phase source 122 on distribution lines 124, 126, 128. First, second and third sensors 130, 132, 134 can be associated with respective ones of the three phases A, B, C to provide input data regarding the power distribution, such as current. Distribution circuit 120 further includes loads 136, 138, 140, 142 each connected to one of the distribution lines 124, 126, 128 with field transformers, generally designated as service transformers 144. For example, loads 136, 140 and 142 are connected to phase A, and load 138 is connected to phase B. Phase C is not connected to the illustrated loads, which results in an unbalanced condition between the three phases A, B, C.

Figures 14A, 14B:
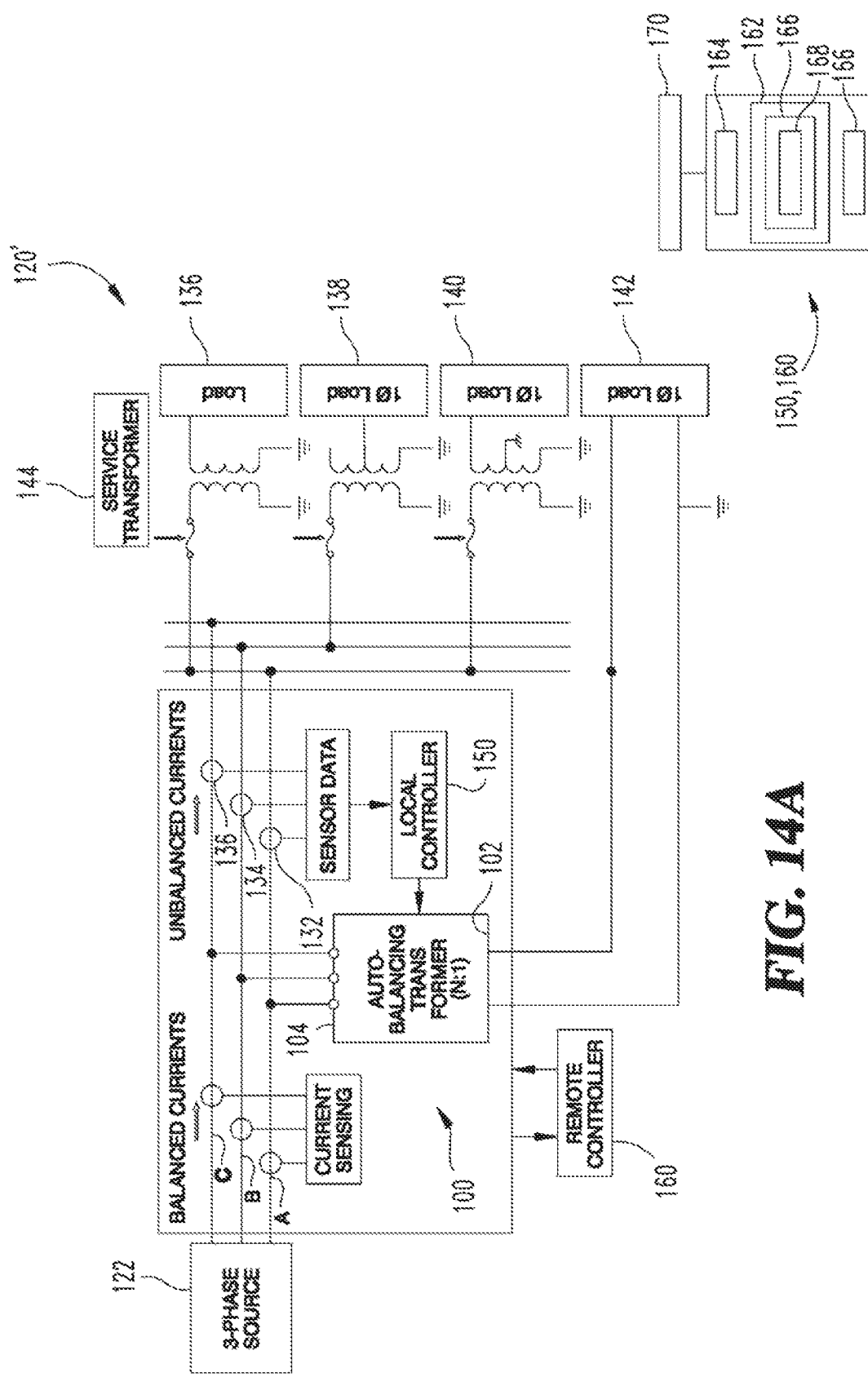
FIG. 14A is a schematic diagram of a nonexclusive illustrative example of a distribution grid, shown with an N:1 auto-balancing transformer installed, where N is one or any positive integer.
FIG. 14B is a schematic diagram of an exemplary controller apparatus.

FIG. 14A illustrates a modified distribution circuit 120' that includes an auto-balancing transformer 100, which can be any embodiment auto-balancing transformer described herein. Auto-balancing transformer 100 is equipped with a local controller 150 which receives sensor data from sensors 130, 132, 134. Local controller 150 can be configured to process the sensor data to determine unbalanced currents and/or loads associated with the three phases A, B, C and position the armature of auto-balancing transformer 100 at an angle so that the currents in phases A, B, C are more balanced. For example, auto-balancing transformer 100 includes a secondary winding as discussed above that is coupled to load 142. The armature can be positioned at a particular angle so that the load 142 is supplied by to phase C of the distribution circuit, balancing the imbalance condition seen from three phase source 122 created by the connection of loads 136, 140 to phase A and load 138 to phase B. Furthermore, in the event of loss of any of the phases A, B or C, the armature angle may be changed such that coupling of the secondary winding is maximum with the healthy phases of the primary source of supply.

Auto-balancing transformer 100 can also be connected to a remote controller 160 at a substation or control room. Remote controller 160 can be configured to position the armature or override the armature positioning commanded by local controller 150 in response to other system conditions that are monitored remotely.

Referring to FIG. 14B, the local and/or remote controller 150, 160 can each include respective ones of a processing device 162, an input/output device 164, a memory 166, and operating logic 168. Furthermore, the controller(s) 150, 160 can communicate with one or more external devices 170 via the input/output device 164. The input/output device 164 may be a transceiver, network adapter, network card, interface, or a port (e.g., a USB port, serial port, parallel port, an analog pod, a digital port, CAT 5, or any other type of port or interface). The input/output device 164 may include hardware, software, and/or firmware.

The external device 170 may be any type of device that allows data to be inputted or outputted from the controller 150, 160. For example, the external device 170 may be an actuator, a motor, a controller adapter, a switch, a router, a firewall, a server, a database, a mobile device, a networking device, a controller, a computer, a processing system, a keyboard, a mouse, or a touch screen display. Furthermore, it is contemplated that the external device 170 may be integrated into the corresponding controller 150, 160. It is further contemplated that there may be more than one external device 170 in communication with the corresponding controller 150, 160.

Processing device 162 can be a programmable type, a dedicated, hardwired state machine, or any combination of these. The processing device 162 may further include multiple processors. Arithmetic-Logic Units (ALUs), Central Processing Units (CPUs), Digital Signal Processors (DSPs), or the like. Processing devices 162 with multiple processing units may utilize distributed, pipelined, and/or parallel processing. Processing device 162 may be dedicated to performance of just the operations described herein or may be utilized in one or more additional applications. In the depicted form, processing device 162 is of a programmable variety that executes algorithms and processes data in accordance with operating logic 168 as defined by programming instructions (such as software or firmware) stored in memory 166. Alternatively or additionally, operating logic 168 for processing device 162 is at least partially defined by hardwired logic or other hardware. Processing device 162 may include one or more components of any type suitable to process the signals received from input/output device 164 or elsewhere, and to provide desired output signals. Such components may include digital circuitry, analog circuitry, or a combination of both.

Memory 166 may be of one or more types, such as a solid-state variety, electromagnetic variety, optical variety, or a combination of these forms. Furthermore, memory 166 can be volatile, nonvolatile, or a combination of these types, and some or all of memory 166 can be of a portable variety, such as a disk, tape, memory stick, cartridge, or the like. In addition, memory 166 can store data that is manipulated by the operating logic 168 of processing device 162, such as data representative of signals received from and/or sent to input/output device 164 in addition to or in lieu of storing programming instructions defining operating logic 168, just to name one example. As shown in FIG. 14B, memory 166 may be included with processing device 162 and/or coupled to the processing device 162.

The various aspects of the processes in the present application may be implemented in operating logic 168 as operations by software, hardware, artificial intelligence, fuzzy logic or any combination thereof, or at least partially performed by a user or operator. In certain embodiments, operations represent software elements as a computer program encoded on a non-transitory computer readable medium, wherein the controller 150, 160 performs the described operations when executing the computer program.

Figure 15:
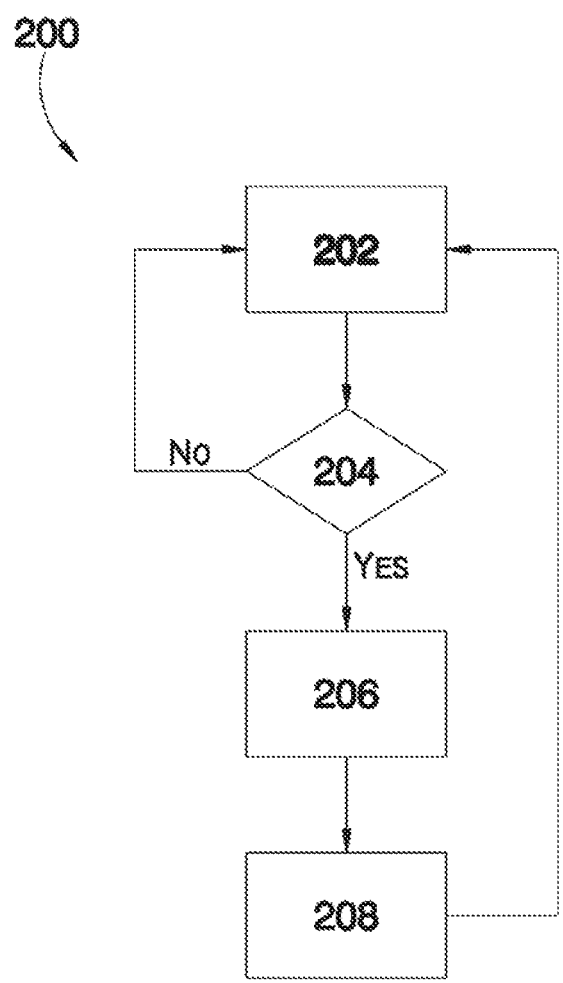
FIG. 15 is a flow diagram of an exemplary procedure for balancing a multi-phase electrical distribution system.
Figure 16:
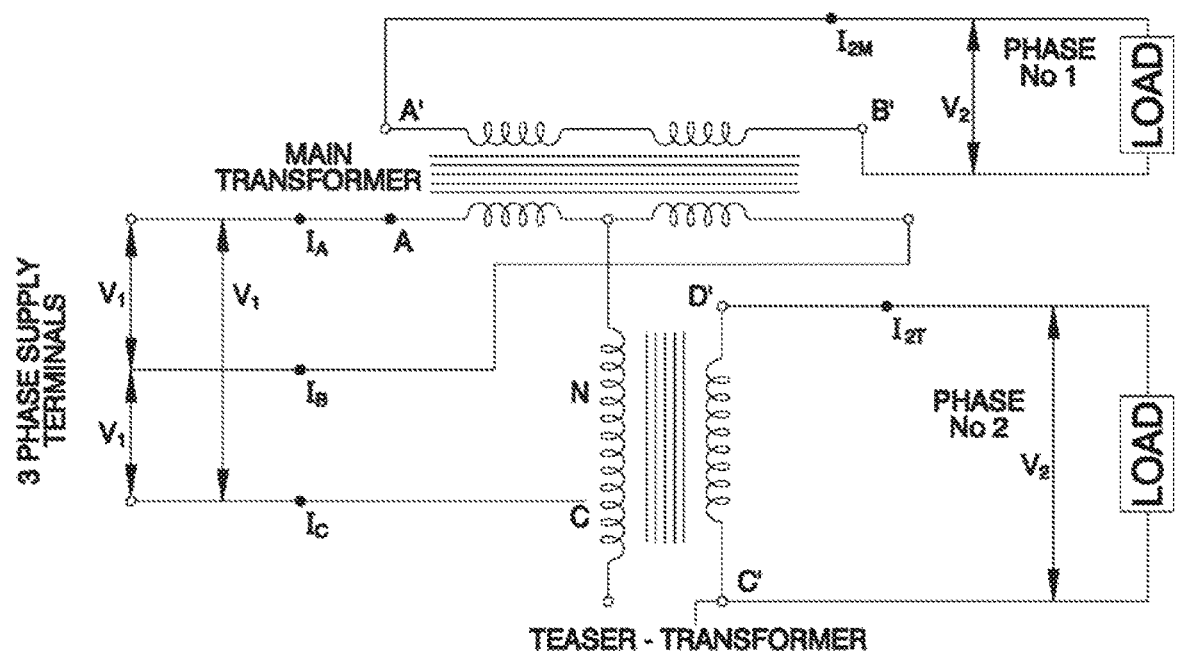
FIG. 16 illustrates a typical connection for transforming three phase power to two phase power using two single phase transformers.
Figure 17:
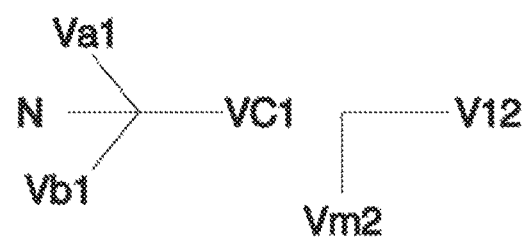
FIG. 17 is a vector diagram of the primary phases for FIG. 16.

FIG. 15 illustrates a schematic flow diagram of an exemplary procedure 200 for correcting an unbalanced load condition with the controller 150 and/or controller 160 and auto-balancing transformer 100. Operations illustrated for all of the procedure in the present application are understood to be examples only, and operations may be combined or divided, and added or removed, as well as re-ordered in whole or in part, unless explicitly stated to the contrary.

Procedure 200 begins at operation 202 in which the local controller 150 receives data from various sensors associated with the primary phases of the distribution grid. The local controller 150 may also receive data regarding a load of the secondary phase or phases coupled to the auto-transformer.

Procedure 200 then proceeds from operation 202 to conditional 204. At conditional 204, the local controller 150 determines if an imbalance condition exists on the primary phases A, B, C. If conditional 204 is negative, procedure 200 returns to operation 202. If conditional 204 is positive, procedure 200 continues at operation 206 to determine the armature angle to create a more balanced condition among the three primary phases.

Procedure 200 then proceeds from operation 206 to operation 208. At operation 208, the local controller 102 may provide an output signal or command to an actuator, servo motor, of other suitable device to control the position of the armature of the auto-balancing transformer 100. Procedure 200 then returns to operation 202.

It is contemplated that the various aspects, features, computing devices, processes, and operations from the various embodiments may be used in any of the other embodiments unless expressly stated to the contrary.

The auto-balancing transformers disclosed herein may be used for power distribution under an unbalanced multi-phase electrical system, such as to reduce or mitigate the unbalance that may occur among the phases in the electrical system. In some examples, power outages due to single phase fault of one of the primary phases can be mitigated by dispersing the single phase secondary load towards the healthy primary phases using the armature of the auto-balancing transformer to electromagnetically couple the healthy phases to the secondary load, which may provide an alternative source of supply. Also, under normal unbalance conditions (without a phase fault) of the primary phases, the auto-balancing transformers disclosed herein may operate in such a way that couples a secondary load to a different phase or phases to mitigate a pre-existing unbalance condition on the distribution grid feeder.

The basic operating principle of the auto-balancing transformers disclosed herein is the variable magnetic coupling between the three phase primary windings and single or dual phase secondary windings provided by the armature, which may permit non-linear coupling to be achieved. As may be understood, the possible different magnetic variations may permit changing the magnetic coupling co-efficient of the secondary winding with any of the three phases of the primary windings. Also, with the angular displacements of the movable armature, the coupling between the primary winding(s) and secondary winding(s) can be changed.

In some examples, the coupling may be partially shared with two or three phases of the primary windings. For example, a suitably shaped armature, such as by the configuration of the ends and/or a suitable physical placement of the primary windings about the secondary winding, may permit selective coupling of one phase, two phases or even three phases of the primary windings with the secondary winding.

In some examples, the primary windings may be two or more phases, such as three phases. In some examples, the secondary winding(s) may be one or two phases. In another example, the number of secondary phases is at least one phase less than the number of primary phases. Nonexclusive illustrative examples include a three phase primary and single phase secondary, a three phase primary and two phase secondary, and a three phase primary to three phase secondary.

The auto-balancing transformers disclosed herein may be used to reduce or counter the unbalance on a three-phase grid that may result from distribution transformers that draw a variable load which is supplied by only one phase from a three phase transformer (which may otherwise cause overloading of the distribution transformer). In use, a feedback control system may position the armature in such a way that the major portion of the load may be drawn from the lightly loaded phase(s).

The auto-balancing transformers disclosed herein may allow avoiding using higher capacity distribution transformers, which are employed to accommodate the draw of unbalanced three phase load from the distribution grid. The auto-balancing transformers disclosed herein eventually balance the loads on the three phase distribution grid with the load from the lateral feeder. In some examples, the auto-balancing transformers disclosed herein may reduce distribution losses, may reduce large unbalance on three phase distribution transformers, may reduce line losses, may assist with voltage profile regulation at the feeder primary, may provide partial restoration options in the event of a single phase feeder fault, and may reduce conductor and pole size in new distribution network designs.

Various aspects of the present disclosure are contemplated. For example, according to one aspect, a transformer includes a first number of primary windings connectable to at least two phases of an electrical system and a second number of secondary windings connectable to an electrical load. The second number is less than or equal to the first number. The transformer also includes a yoke supporting the first number of primary windings and the second number of secondary windings and a movable armature to selectively electromagnetically couple the second number of secondary windings to one or more of the first number of primary windings in response to at least one of an imbalance condition between the phases and a loss of at least one phase of the electrical system.

In one embodiment, the transformer includes a controller configured to receive one or more inputs regarding the imbalance condition and provide an output that positons the armature to vary the electromagnetic coupling between the second number of secondary windings and the first number of primary windings. In another embodiment, the first number is at least two and the second number is one. In a refinement of this embodiment, the first number is three.

According to another aspect, a transformer includes a yoke, a secondary limb, and at least two primary limbs peripherally spaced from the secondary limb. The secondary limb and the at least two primary limbs extend from the yoke. At least two primary windings extend about respective ones of the at least two primary limbs and a secondary winding extends about the secondary limb. The transformer also includes an armature opposite the yoke that extends outwardly from the secondary limb. The armature is movable to selectively couple the secondary winding with one or more of the at least two primary windings.

In one embodiment, the at least two primary windings includes three primary windings. In a refinement of this embodiment, the armature is movable to selectively couple two of the three primary windings with the secondary winding while the other of the three primary windings is disconnected from the electrical system and maintains low magnetizing currents. In another refinement, the armature is movable to selectively couple only one of the three primary windings to the secondary winding while the other two of the three primary windings are disconnected from the electrical system. In yet another refinement of this embodiment, the yoke includes three primary limbs extending therefrom circumferentially about the secondary limb, and an axial gap is provided between adjacent ones of the three primary limbs configured to receive adjacent ones of the three primary windings. Further refinement includes each of the three primary limbs including a concavely curved inner face facing the secondary limb, an opposite convexly curved outer face, and opposite end faces extending between the inner face and the outer face.

In another embodiment, the at least two primary windings includes six primary windings positioned about respective ones of six primary limbs, and the six primary windings are peripherally spaced around the secondary winding. In a refinement of this embodiment, the armature is movable to selectively couple two of the six primary windings to the secondary winding, and the two coupled primary windings are located on opposite sides of the secondary winding. In another refinement, the armature is movable to selectively couple four of the six primary windings to the secondary winding, and two of the four coupled primary windings are located on a first side of the secondary winding and the other two of the four coupled primary windings are located on an opposite side of the secondary winding. In yet another refinement, the yoke includes a central portion and six arms extending radially outwardly from the central portion and the six primary limbs each extend orthogonally from an end of a respective one of the six arms. In a further refinement, each of the six primary limbs includes a circular cross-section. In another further refinement, the cross-section of the six primary limbs is non-circular.

In another embodiment, the transformer is a three phase dry transformer. In still another embodiment, the transformer is a three phase oil-immersed transformer.

According to another aspect, a transformer includes a stator and a plurality of primary windings distributed about the stator. The plurality of primary windings provides three phases. The transformer includes a movable armature within the stator and a secondary winding wound around the armature. The armature is movable to selectively couple the secondary winding with a selected one of the three phases.

In one embodiment, a radial gap is provided between the two phases that are not coupled to the movable armature. In a refinement of this embodiment, each of the three phases is defined by an opposite pair of primary windings on the stator. In a further refinement, the secondary winding is wound around the armature.

According to another aspect, a method includes detecting at least one of an unbalanced condition and a loss of supply on a phase of a multi-phase electrical system, wherein the phase is connectable to a load via at least one primary winding and at least one secondary winding, and moving an armature of an auto-balancing transformer to couple the at least one secondary winding to another phase of the multi-phase electrical system in response to the detected one of the unbalanced condition and the loss of supply.

In one embodiment, the phase is connected to the load when the unbalance condition is detected. In another embodiment, detecting the unbalanced condition includes detecting a fault in at least one phase of the multi-phase electrical system. In still another embodiment, the multi-phase electrical system includes three phases and the auto-balancing transformer includes three primary windings connected to respective ones of the three phases, and the armature is movable to couple a selected one of the three phases to a secondary winding. In yet another embodiment, the multi-phase electrical system includes three phases and the auto-balancing transformer includes three primary windings connected to respective ones of the three phases, and the armature of the auto-balancing transformer is movable to couple a selected two of the three phases to the secondary winding and decouple a currently connected phase.

As used herein the term "configured" should be interpreted to mean that the identified elements, components, or other subject matter are selected, created, implemented, utilized, designed, modified, adjusted and/or intended to perform the indicated action and/or to perform, operate, behave and/or react in the indicated manner.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation of "a," "a first" or "the" element, or the equivalent thereof, should be understood to include incorporation of one or more such elements, neither requiring nor excluding two or more such elements, unless the context clearly indicates otherwise. As used herein, the terms "having", "containing", "including", "comprising" and the like are open ended terms that indicate the presence of stated elements or features, but do not preclude additional elements or features.

Applicant reserves the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A transformer, comprising:
   a first number of primary windings configured to be connected to at least two phases of an electrical system;
   a second number of secondary windings configured to be connected to an electrical load, wherein the second number is less than or equal to the first number;
   a yoke supporting the first number of primary windings and the second number of secondary windings; and
   a movable armature to selectively electromagnetically couple the second number of secondary windings to a first winding of the first number of primary windings in response to at least one of an imbalance condition between the phases and a loss of at least one phase of the electrical system while a second winding of the first number of primary windings is disconnected from the electrical system.

2. The transformer of claim 1, further comprising a controller configured to receive one or more inputs regarding the imbalance condition and provide an output that positions the armature to vary the electromagnetic coupling between the second number of secondary windings and the first number of primary windings.

3. The transformer of claim 1, wherein the first number of primary windings is at least two primary windings and the second number of secondary windings is one secondary winding.

4. The transformer of claim 3, wherein the first number is three.

5. A transformer, comprising:
   a yoke;
   a secondary limb and at least two primary limbs peripherally spaced from the secondary limb, the secondary limb and the at least two primary limbs extending from the yoke;
   at least two primary windings configured to be connected to an electrical system extending about respective ones of the at least two primary limbs;
   a secondary winding extending about the secondary limb; and
   an armature opposite the yoke and extending outwardly from the secondary limb, the armature being movable to selectively couple the secondary winding with a first winding of the at least two primary windings while a second winding of the at least two primary windings is disconnected from the electrical system.

6. The transformer of claim 5, wherein the at least two primary windings includes three primary windings.

7. The transformer of claim 6, wherein the armature is movable to selectively couple two of the three primary windings with the secondary winding while the other of the three primary windings is disconnected from the electrical system and maintains low magnetizing currents.

8. The transformer of claim 6, wherein the armature is movable to selectively couple only one of the three primary windings to the secondary winding while the other two of the three primary windings are disconnected from the electrical system.

9. The transformer of claim 6, wherein the yoke includes three primary limbs extending therefrom circumferentially about the secondary limb, and further comprising an axial gap between adjacent ones of the three primary limbs configured to receive adjacent ones of the-three primary windings.

10. The transformer of claim 9, wherein each of the three primary limbs includes a concavely curved inner face facing the secondary limb, an opposite convexly curved outer face, and opposite end faces extending between the inner face and the outer face.

11. The transformer of claim 5, wherein the at least two primary windings includes six primary windings positioned about respective ones of six primary limbs, wherein the six primary windings are peripherally spaced around the secondary winding.

12. The transformer of claim 11, wherein the armature is movable to selectively couple two of the six primary windings to the secondary winding, wherein the two coupled primary windings are located on opposite sides of the secondary winding.

13. The transformer of claim 11, wherein the armature is movable to selectively couple four of the six primary windings to the secondary winding, wherein two of the four coupled primary windings are located on a first side of the secondary winding and the other two of the four coupled primary windings are located on an opposite side of the secondary winding.

14. The transformer of claim 11, wherein the yoke includes a central portion and six-arms extending radially outwardly from the central portion, and wherein the six primary limbs each extend orthogonally from an end of a respective one of the six arms.

15. The transformer of claim 11, wherein each of the six primary limbs includes a circular cross-section.

16. The transformer of claim 5, wherein the transformer is a three phase dry transformer.

* * * * *